(12) United States Patent
Moerman

(10) Patent No.: US 11,864,545 B2
(45) Date of Patent: Jan. 9, 2024

(54) DIVIDABLE HORSESHOES

(71) Applicant: Bartek Equine LLC, Burlington, WI (US)

(72) Inventor: Sam Moerman, Zulte Olsene (BE)

(73) Assignee: Bartek Equine LLC, Burlington, WI (US)

( * ) Notice: Subject to any disclaimer, the term of this patent is extended or adjusted under 35 U.S.C. 154(b) by 0 days.

(21) Appl. No.: 17/005,169

(22) Filed: Aug. 27, 2020

(65) Prior Publication Data
US 2021/0051936 A1 Feb. 25, 2021

Related U.S. Application Data

(63) Continuation of application No. 16/686,481, filed on Nov. 18, 2019, now Pat. No. 10,785,971, which is a continuation of application No. 15/290,792, filed on Oct. 11, 2016, now Pat. No. 10,477,852, which is a continuation of application No. 14/346,310, filed as
(Continued)

(30) Foreign Application Priority Data

Sep. 21, 2011 (BE) .................................. 201100557

(51) Int. Cl.
*A01L 1/04* (2006.01)
(52) U.S. Cl.
CPC ..................................... *A01L 1/04* (2013.01)
(58) Field of Classification Search
CPC ..... A01L 1/00; A01L 1/02; A01L 1/04; B21K 15/02
USPC .................................................. 168/4, 6, 24
See application file for complete search history.

(56) References Cited

U.S. PATENT DOCUMENTS 150,810 A * 5/1874 Austin ....................... A01L 3/04
168/6
170,911 A * 12/1875 Smith ......................... A01L 1/02
168/24
(Continued)

FOREIGN PATENT DOCUMENTS

DE 102008060198 A1 * 6/2010 ............... A01L 1/02
EP 2103209 A2 * 9/2009 ............... A01L 7/02
(Continued)

OTHER PUBLICATIONS

English-language translation of Luber, DE 10 2008 060 198 A1, provided by USPTO human translator (Year: 2010).*
(Continued)

*Primary Examiner* — Kathleen I Alker
(74) *Attorney, Agent, or Firm* — Ice Miller LLP; Justin Swindells

(57) ABSTRACT

A horseshoe that is dividable into two halves to permit lateral and medial movements of when affixed to a hoof of a horse. The shoe has a bridge flanked on either side by a first leg and a second leg, respectively. Each of a support surface facing the hoof and a ground-facing surface has a groove in a center of the bridge, and both grooves extend between an inner to outer circumference of the shoe. The shoe is initially a single unitary piece having the grooves on both sides of a center of the bridge. The second groove is configured to be cut or sawed through to permit the shoe to follow lateral and medial changes in the hoof and to stimulate blood circulation in the horse.

19 Claims, 4 Drawing Sheets

Related U.S. Application Data application No. PCT/EP2012/068591 on Sep. 21, 2012, now abandoned.

(56) References Cited

U.S. PATENT DOCUMENTS

| | | | | |
|---|---|---|---|---|
| 196,446 | A * | 10/1877 | Hague | A01L 1/04 168/7 |
| 866,558 | A * | 9/1907 | Barker | A01L 1/04 168/7 |
| 1,324,748 | A * | 12/1919 | Sheperdson | A01L 11/00 59/61 |
| 3,090,718 | A * | 5/1963 | Dixon | A01L 1/02 168/7 |
| 4,268,948 | A * | 5/1981 | Strandell | B22D 11/126 72/204 |
| 4,459,892 | A * | 7/1984 | Budzich | B23D 25/12 83/880 |
| 4,557,334 | A * | 12/1985 | Cattaneo | A01L 7/02 168/28 |
| 5,740,865 | A * | 4/1998 | Turk | A01L 7/06 168/4 |
| 6,076,607 | A * | 6/2000 | Bergeleen | A01L 5/00 168/DIG. 1 |
| 6,263,973 | B1 * | 7/2001 | Bergeleen | A01L 1/00 168/4 |
| 2016/0219857 | A1 * | 8/2016 | Fishman | A01L 1/04 |

FOREIGN PATENT DOCUMENTS

| | | | | |
|---|---|---|---|---|
| GB | 155870 | A * | 1/1921 | A01L 1/04 |
| GB | 2459382 | A * | 10/2009 | A01L 1/02 |
| KR | 960011070 | B1 * | 8/1996 | A01L 1/00 |
| WO | WO-0002445 | A1 * | 1/2000 | A01L 1/00 |
| WO | WO-2017190879 | A1 * | 11/2017 | A01L 1/04 |

OTHER PUBLICATIONS

Machine translation of KR-960011070-B1 to Kim. (Year: 1996).*
Machine translation of WO-0002445-A1 to Hasegawa. (Year: 2000).*
Machine translation of WO-2017190879-A1 to Denke. (Year: 2017).*
Machine translation of EP-2103209-A2 to Fischlein. (Year: 2009).*

* cited by examiner

DIVIDABLE HORSESHOES

This application is a continuation of U.S. patent application Ser. No. 14/346,310 filed Mar. 20, 2014, which claims priority to Belgian Application Serial No. BE201100557 filed Sep. 21, 2011, which are hereby incorporated by reference in their entirety.

FIELD OF THE INVENTION

The present invention concerns a horseshoe comprising two legs connected by a bridge. The present invention further concerns a method for upgrading existing horseshoes as well as a method for applying a horseshoe according to the invention on a hoof of an ungulate.

BACKGROUND OF THE INVENTION

Horseshoes are used to cover the hooves of ungulates, amongst others to prevent damage and wear and tear of the hooves, and more specifically to keep the natural movement, such as the resilience and flexibility in the hooves; intact.

When applying horseshoes there is a constant challenge to keep the hoof mechanism as intact as possible.

The proper operation of the hoof mechanism ensures good blood circulation and cushioning in the hooves and legs when the horse moves.

The operation of the hoof mechanism is activated because the hoof is able to change its resilience and shape when the hoof is stressed by the impact of the horse's weight on the surface over which the horse is moving.

When the hoof is stressed, the sole of the hoof is pushed down, causing the radius to share the pressure and compress the hoof, making it laterally and medially wider at the ground surface of the hoof, which causes a cushioning effect that benefits the legs of the horse.

When the hoof is no longer stressed, it returns to its original form and becomes laterally and medially smaller at the ground surface.

The change in shape of the hoof during stressing and relieving causes a pump effect in the hoof, which encourages the blood circulation in the hoof and the legs of the horse.

The stimulation of blood circulation created by the pump effect which takes place in the feet, also have a supporting effect on the general blood circulation in the horse's body.

Good blood circulation facilitates the supply of oxygen, nutrients and removal of waste which improves the performance and recovery.

The flexibility and resilience of the hoof enables the hoof to absorb lateral and medial bumps in the surface over which the horse is moving, which benefits the upper joints, tendons and ligaments as they have little lateral or medial movement or flexing.

It is therefore very important that the flexibility and resilience of the hoof remains as intact as possible when fitting an horseshoe, ensuring that the hoof mechanism can work optimally.

It is therefore important to reduce the fixation of the hoof to a minimum when fitting the horseshoe and to maintain the flexibility and resilience in the hoof.

A traditional horseshoe fixes the lateral and medial side of the hoof with a non-flexible or non-bendable U-shaped or closed element in metal, aluminium, titanium, plastic or other related materials that is attached to the hoof using hoof nails, which hampers the hoof mechanism.

When applying traditional horseshoes; the horseshoe is fitted on an unstressed (lifted) hoof wherein the hoof remains in its smallest position, when applying the shoeing the hoof is fixed in its unstressed position, severely hampering the flexibility and resilience when the hoof impacts the surface.

The impact of the fixation created by applying the horseshoe on unstressed hooves has a far worse effect on the flexibility and resilience of the hoof when the horse moves, this impact increases together with the speed at which the horse moves.

The fixation of the hoof with the traditional horseshoe severely hampers the change of shape of the hoof, which causes the cushioning of the hooves to be severely reduced, sending the shock to the upper joints, which results in foot, leg or other problems.

When applying traditional horseshoes, the lateral and medial side of the hoof is fixed so that the lateral and medial stress on the hoof can no longer be absorbed individually, creating additional stress on the horse's joints and legs since it can permit little or no lateral deflection or stress.

The obstruction of the hoof mechanism with the fixation of the hoof using traditional horseshoes also hampers the pump effect that is generated with the change of shape of the hoof created when the horse moves, resulting in reduced stimulation of blood circulation.

The fixation of the hoof will also negatively affect the horse's performance since the oxygen supply to the legs and hooves are stimulated less by the pump effect of the hoof mechanism, which influences the performance and recovery.

The fixation of the hoof will also result in a reduced blood circulation, which will have a negative influence on the supply and discharge of nutrients and waste, this in turn can have a negative influence on the quality of the hoof.

In an attempt to address the abovementioned issues related to the traditional shoeing for ungulates several types of horseshoes have been described.

DE 10 2010 037 762 and US 2002/0023760 for example disclose a horseshoe comprising two legs connected by a bridge, wherein the bridge is flexible such as to allow "independent" vertical and lateral movement of the legs when attached on a hoof.

The disclosed prior art horseshoes however have the important drawback that they are very difficult to fit and subsequently fixed on a hoof due to lack of rigidity of the bridge of the horseshoes or even worse break along the bridge when forcing the horseshoe in a form fitting the hoof. Indeed, when fitting a horseshoe, a farrier bends the horseshoe along the bridge to fit the legs of the horseshoe on the hoof of the ungulate. This can be done both warm and cold, depending on the farriers' preference or the relevant horseshoe. Once bent in the right position, the horseshoe ideally rigidly remains its adjusted shape allowing the farrier to attach the horseshoe to the hoof and to finish the horseshoe.

Another drawback of the horseshoes described in DE 10 2010 037 762 and US 2002/0023760 is that these horseshoes are rather expensive and difficult in manufacturing and fitting, resulting a considerable higher cost for both the horseshoe and the application thereof on a hoof.

DE 102008060198 discloses a horseshoe comprising a frangible section in the bridge of the horseshoe for separating the horseshoe legs from one another after attaching the horseshoe on a hoof.

A drawback of a horseshoe according to DE 102008060198 is that the horseshoe is prone to break when fitting the horseshoe. Moreover this type of horseshoe is considered difficult to divide along the frangible section without the risk of hurting the ungulate.

It is clear that based on the prior art there remains a need for a horseshoe that addresses the above problems and drawbacks.

SUMMARY OF THE INVENTION

The present invention concerns a horseshoe comprising two legs connected by a bridge, characterized the bridge comprises physical markers provided directly opposite one another in both a support surface i.e. the surface of the horseshoe facing the hoof when in use and on the ground surface facing away from the hoof when in use, wherein said physical markers function as a guide between an outer circumference of the bridge and an inner circumference of the bridge, for cutting through the bridge of the horseshoe.

The invention further concerns a method of application of a horseshoe as identified here above, the method comprising the steps of:
  a. Fitting the horseshoe to a hoof and potentially adapting the horseshoe shape to the concerning hoof;
  b. Attaching the horseshoe to the hoof;
  c. Dividing the horseshoe in two parts by cutting through or sawing through the bridge along the physical marker in the ground surface of the horseshoe Finally the invention concerns a method of upgrading a (traditional) horseshoe, the method comprising the step of: providing physical markers on the bridge of the horseshoe at positions directly opposite one another both on the around surface and the support surface.

BRIEF DESCRIPTION OF THE DRAWINGS

With the intention to better indicate the characteristics of the invention, the implementation form of this method is provided below as example, without any restrictive character, with reference to accompanying FIGS. 1 through 4 where:

FIG. 1a represents a one-piece horseshoe (10) according to the invention with physical markers (1) applied in the toe section (3) on the ground surface (4)

FIG. 1b represents a one-piece horseshoe (10) according to the invention with physical markers (2) applied in the toe section (3) on the support basis (5)

FIG. 2a reflects the position of the physical markers (1 and 2) in the ground surface (4) and the support basis (5) with the inner circumference (6) of the one-piece horseshoe (10)

FIG. 2b reflects the position of the physical markers (1 and 2) in the ground surface (4) and the support basis (5) with the outer circumference (7) of the one-piece horseshoe (10)

FIG. 3a reflects the position of the one-piece horseshoe (10) applied in the hoof by means of hoof nails, with cut groove (8) in the support basis (5), this cut groove (8) was cut with the reference of the physical markers (2) serving as guide grooves applied in the same support basis (5) as seen from the rear of the hoof FIG. 3b reflects the position of the one-piece horseshoe (10) applied in the hoof by means of hoof nails, with cut groove (8) in the support basis (5), this cut groove (8) was cut with the reference of the physical markers (2) serving as guide grooves applied in the same support basis (5) as seen from the front of the hoof

GENERAL LEGEND OF FIGURES

Figure 1A:
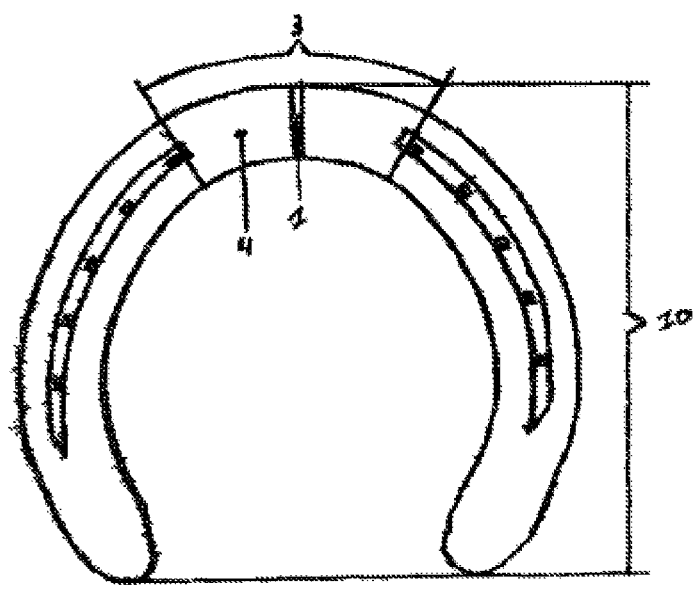
FIGS. 1a and 1b: ground surface (4) and support basis (5) horseshoe
Figure 1B:
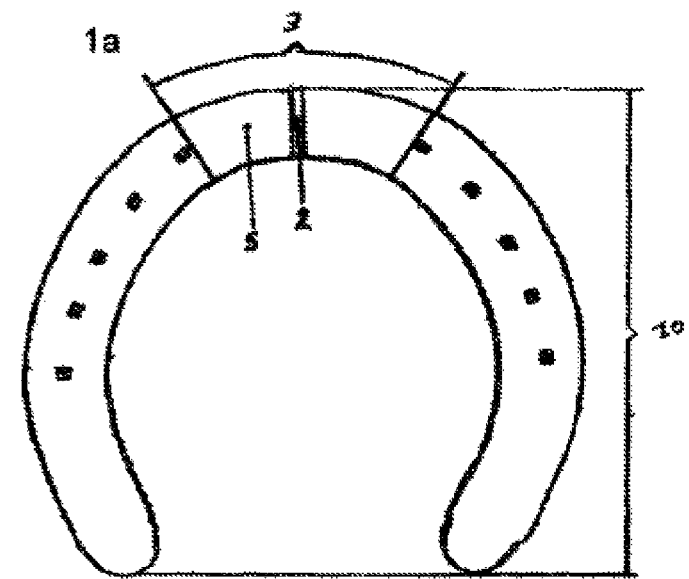

1=physical marker in the ground surface
2=physical marker in the support basis
3=toe section of horseshoe
4=ground surface of horseshoe
5=support basis of horseshoe
6=inner circumference of horseshoe
7=outer circumference of horseshoe
8=cut marker 2
9=marker 1 cut through
10=one-piece horseshoe
11=two-piece horseshoe FIG. 1 represents a horseshoe according to the present invention, the horseshoe comprising two legs connected by a bridge 3, the bridge 3 comprising physical markers 1 and 2 provided directly opposite one another in both a support surface 5 i.e. the surface of the horseshoe facing the hoof when in use and on the ground surface 4 facing away from the hoof when in use, wherein said physical markers 1, 2 function as a guide between an outer circumference of the bridge and an inner circumference of the bridge, for cutting through the bridge 3 of the horseshoe.

The horseshoe can be manufactured in amongst others, metal, steel, aluminium, titanium, cupper, plastic or an admixture thereof.

Figure 2A:
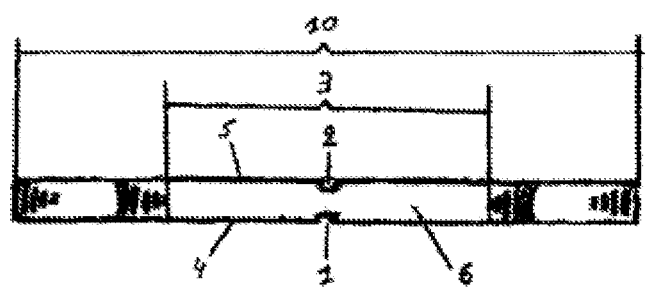
FIGS. 2a and 2b: inner circumference (6) and outer circumference (7) horseshoe
Figure 2B:
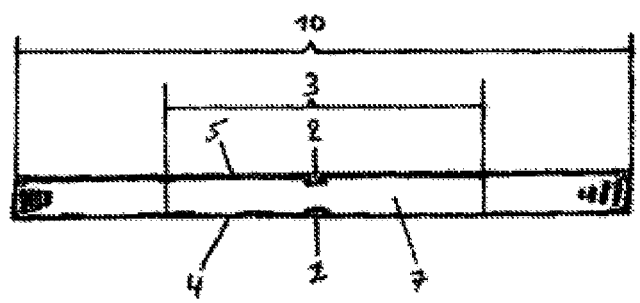

Preferably the physical markers 1 and 2 comprise a groove as depicted in FIG. 2. Alternatively a line can be used as physical marker on either the ground surface 4 and/or the support surface 5.

The physical marker 1, 2, here a groove preferably extends over the entire width of the concerning bridge 3 surface from an outer circumference 7 of the bridge and an inner circumference 6 of the bridge.

In case the physical marker is executed as a groove, it is important that the remaining material section of the bridge in the section of the physical marker provides sufficient strength and rigidity to the horseshoe such that during fitting the horseshoe does not break and yet remains it adapted form allowing easy fixation of the horseshoe on the concerning hoof.

The depth of the physical marker groove 1 in the ground surface 4 of the bridge is therefore preferably maximally about 60% of the thickness of the bridge 3 of the horseshoe, whereas the depth of the physical marker groove 2 in the support surface 5 of the bridge 3 is preferably maximally about 15% of the thickness of the bridge 3 or vice versa.

The horseshoe according to the invention can be easily fitted and attached to a hoof of an ungulate by the following method according to the invention, the method comprising the steps of:

a. Fitting the horseshoe to a hoof and potentially adapting the horseshoe shape to the concerning hoof;
b. Attaching the horseshoe to the hoof;
c. Dividing the horseshoe in two parts by cutting through or sawing through the bridge 3 along the physical marker f in the ground surface 4 of the horseshoe.

Preferably, the method comprises the additional step a') of making a physical groove 8 or deepening the groove in the support surface 5 of the horseshoe using the physical marker 2 as a guide in between steps a) and b).

By applying this additional step a') after step a) wherein a certain rigidity of the horseshoe is required to avoid breaking thereof during fitting, the cutting through or sawing through of the bridge 3 after attaching the horseshoe on a hoof is made easier (FIG. 3) and hurting the animal or damaging the hoof can be avoided as the distance from the maintaining material to the hoof is enlarged.

Figure 4A:
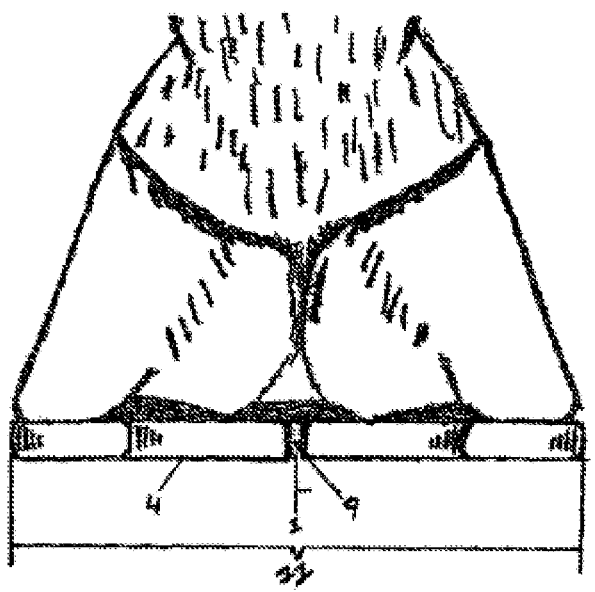
FIGS. 4a and 4b: applied two-piece horseshoe (11) front and rear view FIG. 4a reflects the position of a two-piece horseshoe (11) on the hoof that originates after the horseshoe has been cut through, with the reference of the physical marker (1), serving as guide groove (9) applied in the same ground surface (4) as seen from the rear of the hoof FIG. 4b reflects the position of a two-piece horseshoe (11) on the hoof that originates after the horseshoe has been cut through, with the reference of the physical marker (1), serving as guide groove (9) applied in the same ground surface (4) as seen from the front of the hoof
Figure 4B:
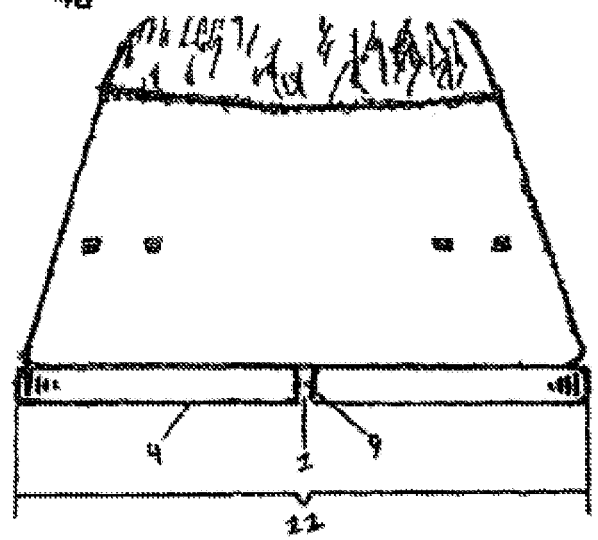

As represented in FIG. 4, when completing the method according to the present invention, a horseshoe is obtained that is fixed to a hoof and comprises two separate parts divided by a cutting or sawing line 9. As such the horseshoe provides a solution to the abovementioned issues regarding the lateral and medial fixation of the foot, the hoof mechanism, the resilience of the hoof, the high degree of difficulty of the fabrication and the application of the pre-designed horseshoes to keep the hoof mechanism and the cushioning of the hoof as intact as possible.

Another advantage of the horseshoe and method for application thereof according to the present invention is that for a farrier this method hardly or even not comprises more effort for the farrier than when applying a traditional horseshoe that remains in one piece after application.

The farrier can fit the horseshoe as with traditional horseshoes, this can be done both warm and cold depending on the farriers' preference or the relevant horseshoe.

Figure 3A:
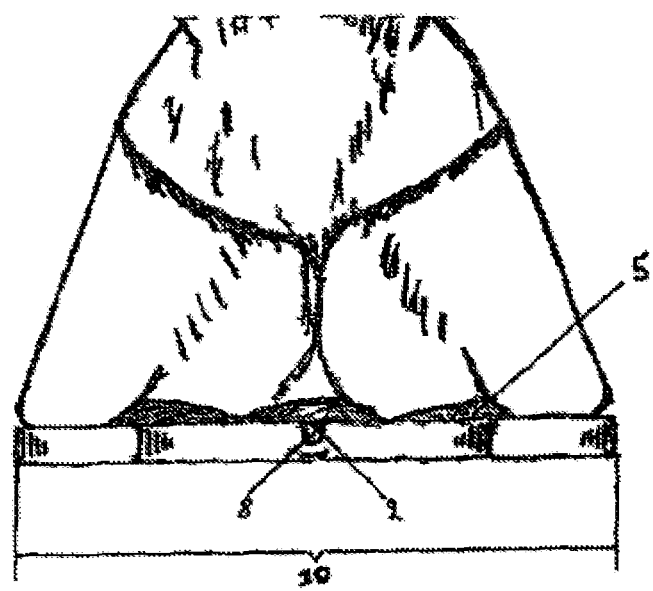
FIGS. 3a and 3b: applied one-piece horseshoe (10) front and rear view
Figure 3B:
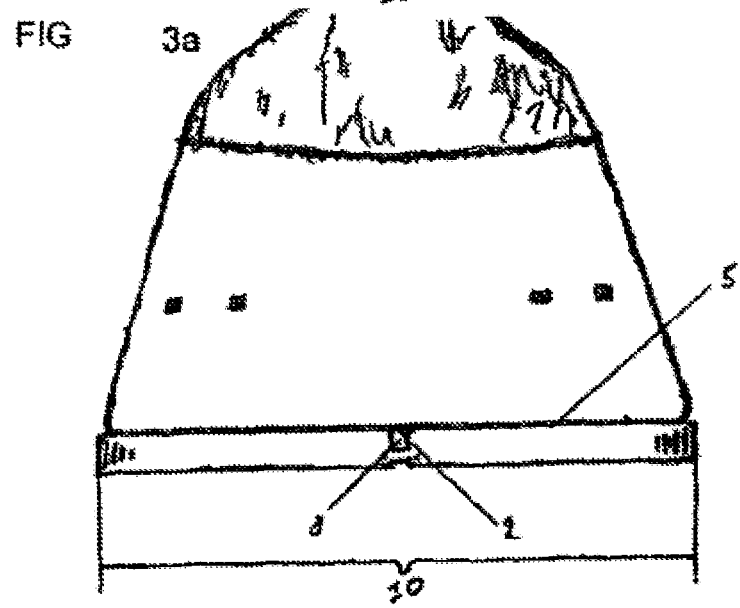

When the horseshoe is fitted using the traditional method, the farrier deepens the physical marking located in the support surface of the horseshoe, serving as guide grooves, until approximately 60% of the thickness of the horseshoe is as such that the shape of the appropriate horseshoe remains intact, but only a minimal of material is present between the grooves 1 and 8 in the bridge (FIG. 3).

After this operation, the horseshoe is further attached and finished on the hoof with the traditional method by means of hoof nails.

After the horseshoe is applied and finished traditionally, the farrier will cut the physical marker in the surface of the horseshoe, serving as guide grooves, the remaining thickness of the horseshoe, changing the horseshoe from a single element into a horseshoe made of two elements, which in turn can follow the lateral and media changes in the hoof, individually.

Reducing the fixation of the horseshoe to a minimum, results in a better operation of the hoof mechanism. This ensures that the blood circulation is better stimulated than with the usual traditional horseshoe.

Reducing the fixation of the horseshoe to a minimum ensures a better operation of the hoof mechanism, creating the pump effect in the hooves which encourages the blood circulation and has a supporting effect on the general blood circulation in the horse's body.

Reducing the fixation of the horseshoe to a minimum ensures a better operation of the hoof mechanism which, through the stimulation of good blood circulation, ensures a good supply and discharge of oxygen, nutrition and waste which benefits the performance, recovery and good hoof quality of the hooves.

Reducing the fixation of the horseshoe to a minimum enables the hoof to change shape and to be become wider on the ground when it is stressed and compressed between the weight of the horse and the surface over which the horse is moving, resulting in proper cushioning in the hooves and the legs of the horse.

The invention claimed is:

1. A shoe configured to be attached to a hoof of a horse, the shoe comprising:
   a support surface facing the hoof when attached directly thereto;
   an exposed ground-facing surface facing a ground surface when the support surface is attached to the hoof;
   a first leg and a second leg, each of the first and second legs having a plurality of holes arranged in a recess on the ground-facing surface;
   a bridge having a thickness; and
   a first groove and a second groove formed in a center of the bridge on opposite surfaces thereof,
   the first groove being on the support surface and the second groove being directly opposite and co-aligned with the first groove on the ground-facing surface,
   each of the first groove and the second groove extending between an outer circumference of the bridge and an inner circumference of the bridge to form a physical marker running in a straight line such that the bridge has a reduced thickness between the first and second grooves, wherein a side of the bridge along the inner circumference is free, wherein the first groove has a depth that is greater than a depth of the second groove and is maximally 60% of the thickness of the bridge,
   the shoe being a single unitary piece, rigid, and composed of a material including a metal or a polymer or a combination thereof.

2. The shoe of claim 1, wherein:
   a segment of maintaining material is defined between respective bottom surfaces of the first and second grooves.

3. The shoe of claim 1, wherein a thickness of the segment of maintaining material is at least 25% of the thickness of the bridge.

4. The shoe of claim 1, wherein the first groove defines a depth that is maximally 15% of the thickness of the bridge.

5. The shoe of claim 1, wherein at least one of the first groove and the second groove defines a flat bottom surface and a squared U-shape cross-sectional profile.

6. The shoe of claim 1, wherein the depth of the first groove and the depth of the second groove together are maximally 75% of the thickness of the bridge.

7. The shoe of claim 1, wherein the first groove and the second groove run in the straight line across an entire width of the bridge from the inner circumference to the outer circumference.

8. The shoe of claim 1, the second groove serving as a guide to cut through a segment of maintaining material between the first groove and the second groove.

9. A horseshoe configured to be attached to a hoof, comprising:
   a shoe forward end defined at a forward half of the horseshoe;
   a shoe rearward end that is opposite the shoe forward end with the shoe rearward end defined at a rearward half of the horseshoe;
   a ground-facing surface that faces downwardly toward the ground when the horseshoe is attached to the hoof;
   a support surface that faces upwardly away from the ground when the horseshoe is attached to the hoof;

a first leg arranged at a first side of the horseshoe, wherein the first leg:
  extends along a first curved path from the shoe forward end to the shoe rearward end; and
  defines a first apex area corresponding to a portion of the first leg in which a first apex position is defined, wherein the first apex position is spaced transversely furthest from a longitudinal centerline of the horseshoe in a first direction;
a second leg arranged at a second side of the horseshoe, wherein the second leg:
  extends along a second curved path from the shoe forward end to the shoe rearward end; and
  defines a second apex area corresponding to a portion of the second leg in which a second apex position is defined, wherein the second apex position is spaced transversely furthest from the longitudinal centerline of the horseshoe in a second direction that is opposite the first direction;
wherein a maximum shoe width location of the horseshoe is defined between the first and second apex positions of the first and second legs;
a bridge having a thickness and arranged between and connected to respective forward ends of the first and second legs, wherein the bridge defines:
  a support groove extending into the support surface from the support surface to a bottom surface of the support;
  a ground groove extending into the ground-facing surface from the ground-facing surface to a bottom surface of the ground groove; and
  a segment of maintaining material between the respective bottom surfaces of the support groove and of the ground groove, wherein the segment of maintaining material extending from the bottom surface of the support groove to the bottom surface of the ground groove defines a thickness of the maintaining material;
a first set of nail holes defined by at least four nail holes arranged at the first leg; and
a second set of nail holes defined by at least four nail holes arranged at the second leg;
wherein the first and second sets of nail holes provide securing positions for securing the horseshoe to the hoof, and
each of the support groove and the ground groove forming a respective physical marker running as a straight line between an outer circumference and an inner circumference of the horseshoe, wherein the thickness of the maintaining material is at least 25% of the thickness of the bridge.

10. The horseshoe of claim 9, wherein the depths of the support and ground grooves together are maximally 75% of the thickness of the bridge.

11. The horseshoe of claim 9, wherein: at the first leg, at least one nail hole of the first set of nail holes is arranged in the first apex area; and at the second leg, at least one nail hole of the second set of nail holes is arranged in the second apex area.

12. The horseshoe of claim 9, wherein:
  the securing positions are provided at both the forward half and the rearward half of the horseshoe, including:
  at the first leg, at least one nail hole of the first set of nail holes is arranged in the rearward half of the horseshoe and at least one nail hole of the first set of nail holes is arranged in the first apex area; and
  at the second leg, at least one nail hole of the second set of nail holes is arranged in the rearward half of the horseshoe and at least one nail hole of the second set of nail holes is arranged in the second apex area.

13. The horseshoe of claim 9, wherein a depth of the support groove is different from a depth of the ground groove.

14. The horseshoe of claim 13, wherein the depth of the support groove is greater than the depth of the ground groove.

15. The horseshoe of claim 9, the ground groove serving as a guide to cut through the segment of maintaining material between the support groove and the ground groove.

16. The horseshoe of claim 9, wherein the thickness of the maintaining material does not exceed 70% of the thickness of the bridge.

17. The horseshoe of claim 9, wherein at least one of the support groove and the ground groove defines a flat bottom surface and a squared U-shape cross-sectional profile.

18. The horseshoe of claim 9, wherein the straight line runs across an entire width of the bridge from the inner circumference to the outer circumference.

19. The horseshoe of claim 9, wherein the depth of the support groove is equal to the depth of the ground groove and is maximally 15% of the thickness of the bridge.

* * * * *